(12) United States Patent　　　(10) Patent No.:　US 12,562,619 B1

Thurow　　　　　　　　　　　　　(45) Date of Patent:　　Feb. 24, 2026

(54) CONTINUOUS ELECTRIC POWER GENERATOR

(71) Applicant: Russel Ernest Thurow, Royse City, TX (US)

(72) Inventor: Russel Ernest Thurow, Royse City, TX (US)

( * ) Notice: Subject to any disclaimer, the term of this patent is extended or adjusted under 35 U.S.C. 154(b) by 0 days.

(21) Appl. No.: 19/308,199

(22) Filed: Aug. 23, 2025

(51) Int. Cl.

| | |
|---|---|
| *F03G 3/08* | (2006.01) |
| *F03G 3/00* | (2006.01) |
| *H02K 7/18* | (2006.01) |
| *H02K 11/00* | (2016.01) |

(52) U.S. Cl.

CPC ........... H02K 7/1853 (2013.01); F03G 3/094 (2021.08); H02K 11/0094 (2013.01)

(58) Field of Classification Search

CPC ............ H02K 7/00; H02K 7/006; H02K 7/18; H02K 7/1807; H02K 7/1846; H02K 7/1853; H02K 7/20; H02K 11/00; H02K 11/0094; F03G 3/00; F03G 3/09; F03G 3/094

See application file for complete search history.

(56) References Cited

U.S. PATENT DOCUMENTS

| | | | |
|---|---|---|---|
| 9,847,696 B2 | 12/2017 | Karousos | |
| 2009/0051169 A1* | 2/2009 | Kostoff | ................ H02K 7/1815 |
| | | | 290/1 R |
| 2014/0083800 A1 | 3/2014 | Ribeiro | |
| 2025/0035091 A1* | 1/2025 | Roach | ..................... F03G 3/094 |

FOREIGN PATENT DOCUMENTS

| | | | | |
|---|---|---|---|---|
| CN | 111502935 A | * | 8/2020 | ............... F03G 3/08 |
| TW | M522999 U | * | 7/2015 | ............... F03G 3/08 |
| TW | 201919313 A | | 5/2019 | |
| WO | 2009127445 A1 | | 10/2009 | |
| WO | 2013144910 A1 | | 10/2013 | |
| WO | 2015078098 A1 | | 6/2015 | |

* cited by examiner

*Primary Examiner* — Tran N Nguyen

(74) *Attorney, Agent, or Firm* — Stonebridge IP, PLLC

(57)　　　　　　ABSTRACT

A continuous electric power generator includes a three dimensional rectangular frame formed by twelve edges, a top crossbar including a circular hub disposed at the top center of the three dimensional rectangular frame, including three extension arms connected to the circular hub at approximately 120 degree angles, the three extension arms each including a connector connected to a weight, wherein the attached extension arms of the circular hub, and attached weights, are configured to rotate freely in a circular motion, and the frame is configured at a compound angle to cause the weights to rotate in an eccentric circle with respect to an axis of rotation at the top center of the three dimensional frame, and the circular hub is connected to a compensating motor and one or more electric generators, and the electric generator(s) are connected to one or more storage batteries.

10 Claims, 3 Drawing Sheets

CONTINUOUS ELECTRIC POWER GENERATOR

BACKGROUND

Description of the Related Art

Alternative methods of energy production have focused heavily on wind production. New methods of energy production, however, as alternatives to wind generators are needed.

SUMMARY DISCLOSURE OF THE INVENTION

A continuous electric power generator includes a three dimensional rectangular frame formed by twelve edges, a top crossbar including a circular hub disposed at the top center of the three dimensional rectangular frame, including three extension arms connected to the circular hub at approximately 120 degree angles with each other, the three extension arms each including a connector connected to a weight, wherein the attached extension arms of the circular hub, and attached weights, are configured to rotate freely in a circular motion, and the frame is configured at a compound angle to cause the weights to rotate in an eccentric circle with respect to an axis of rotation at the top center of the three dimensional frame, and the circular hub is connected to a compensating motor and one or more electric generators, and the electric generator(s) are connected to one or more storage batteries.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DISCLOSURE OF THE INVENTION

The following detailed description is provided to assist the reader in gaining a comprehensive understanding of the methods, products, and/or systems described herein. However, various changes, modifications, and equivalents of the methods, products, and/or systems described herein will be apparent to an ordinary skilled artisan.

MODES FOR CARRYING OUT THE INVENTION

The present invention is directed to a continuous electric power generator that includes a three-dimensional rectangular frame, a rotating hub positioned at the top center of the three-dimensional rectangular frame comprising three rotating arms with attached connected or hanging weights that rotate in a generally circular motion. The rotation of the hub created by the three rotating arms and associated weights can be converted into electrical energy with an electrical generator, e.g., an alternator, and then stored in batteries.

There can be a single alternator or a plurality of alternators. In one embodiment, the device uses a single 120 Volt generator. In another embodiment, the device uses four 12 Volt generators. Other combinations of generators can also be used. In embodiments, from 1 to 10 electric generators may be present. The rotation of the weights can be made to be eccentric.

Mechanical eccentric rotation refers to the rotation of the weights being eccentric (off center) because the weights rotate off-center with respect to the axis of rotation, e.g., the top center of the frame. This offset creates a constant change in the distance between the axis and the weight which is utilized to generate motion of a reciprocating or oscillating nature. The eccentric rotating weight thus produces motion.

Figure 1:
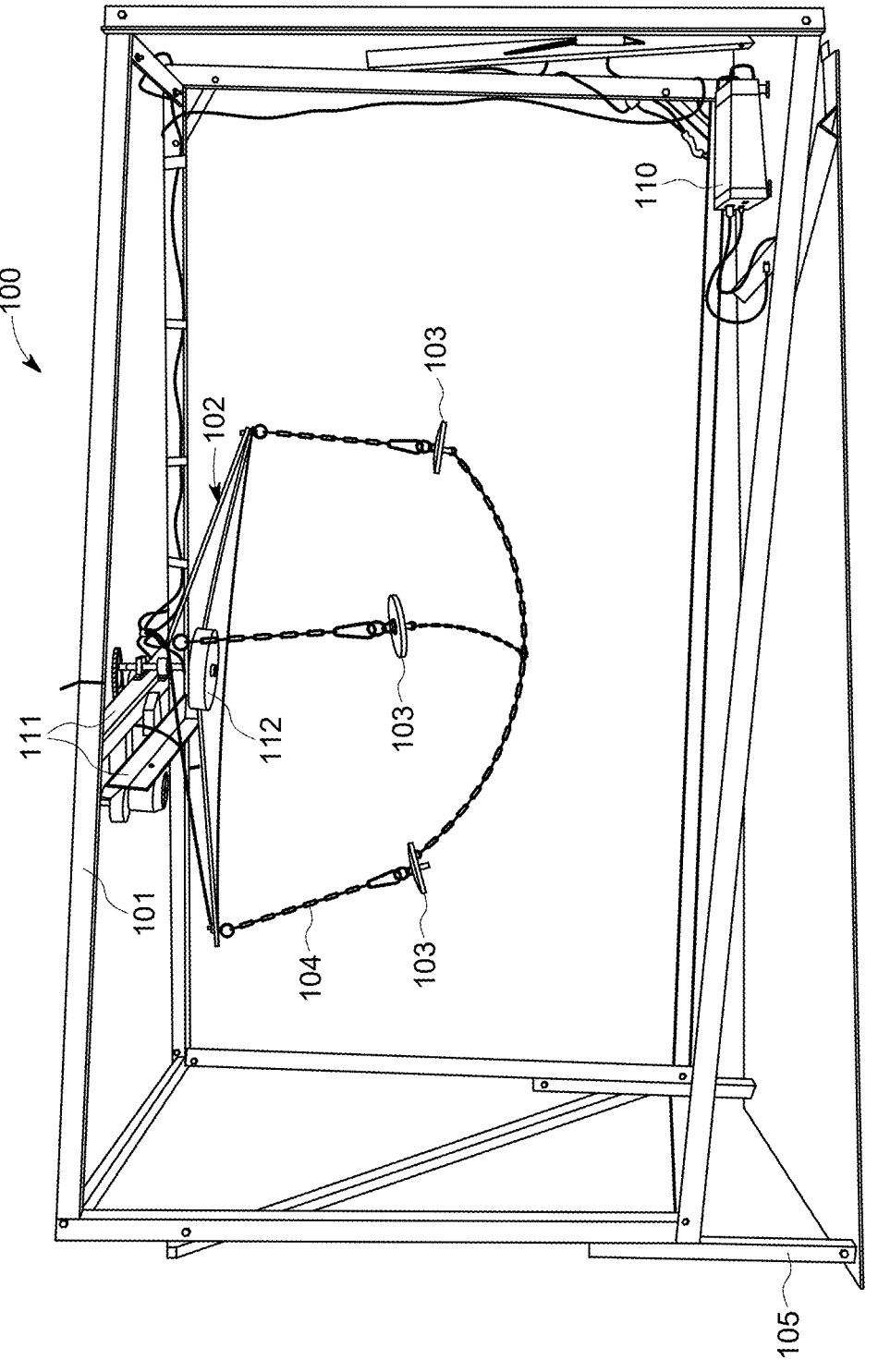
FIG. 1 shows an embodiment of a continuous electric power generator of the disclosure.

The three-dimensional rectangular frame may include, or be defined by, twelve edges. Four edges forming a rectangle, four edges forming a second rectangle and four edges connecting the two rectangles together at each corner, thus forming a three-dimensional rectangular shape. This is Illustrated in FIG. 1. The twelve edges may be defined by individual connectors that are connected to each other to form the rectangular shape or any of the connectors or edges may be integrally formed. The entire frame can thus be integrally formed or can be formed by up to twelve separate connectors or edges. More than one connector can also be connected in series to form an edge. Thus, more than 12 connectors may be present in such a case. The edges or connectors may comprise, or consist of, metal including iron, steel, or aluminum.

The three-dimensional rectangular frame can be set on four legs: one at each corner of the bottom of the rectangular frame. Three legs can be approximately the same height; and a fourth leg can range from 6 to 12 inches in height longer than the other legs. One leg being longer than the other three sets the frame at a compound angle which causes eccentric rotation of the weights with respect to the axis of rotation at the top center of the three-dimensional frame. In another embodiment, three legs may not be present and a fourth leg at one corner of the frame may provide the eccentric shape and eccentric rotation of the weights. In another embodiment, two of the legs may be different heights to create the compound angle. This is illustrated in FIG. 1. In general, any such arrangement that causes the three-dimensional frame to be at a compound angle that causes eccentric rotation of the weights as described above is contemplated.

In embodiments, the frame can range from four to twelve feet long, two to six feet wide, and two to six feet high. Nevertheless, as one of ordinary skill would fully appreciate, the frame can be scaled up or down as appropriate and as necessary for a particular energy production need. As mentioned above, in one example, the present invention could be used to replace wind turbine electric energy generators. A frame size capable of generating an amount of electrical power typical for a wind turbine generator can thus be used. The system can therefore be scaled up to produce up to two to three megawatts of electrical power in embodiments.

The weights can be attached to rotating arms connected to the rotating hub, in one example, with metal chains. The entire frame is set at a compound angle which creates an eccentric rotation of the weights. Thus, when one arm goes from 0 to 180 degrees it goes outward and down while the other two weights are going upward and inward due to the eccentric rotation. The weights can also be connected to each other while rotating to create continuous kinetic energy. In embodiments, the weights can also be connected to each other with chains.

The rotation of the weights would eventually stop due to air resistance and friction. This can be compensated for by providing a compensating motor. In embodiments, the compensating motor may be a 12-volt motor. A portion of the electrical power from one or more of the electrical generators connected to the hub can be fed back to the 12 Volt compensating motor.

FIG. 1 shows an embodiment of a continuous electric power generator 100 of the disclosure. FIG. 1 shows frame 101, extension arms 102, chains 104, weights 103, circular hub 112, elongated or extended frame leg 105, cross bars 111, and inverter 110.

Figure 2:
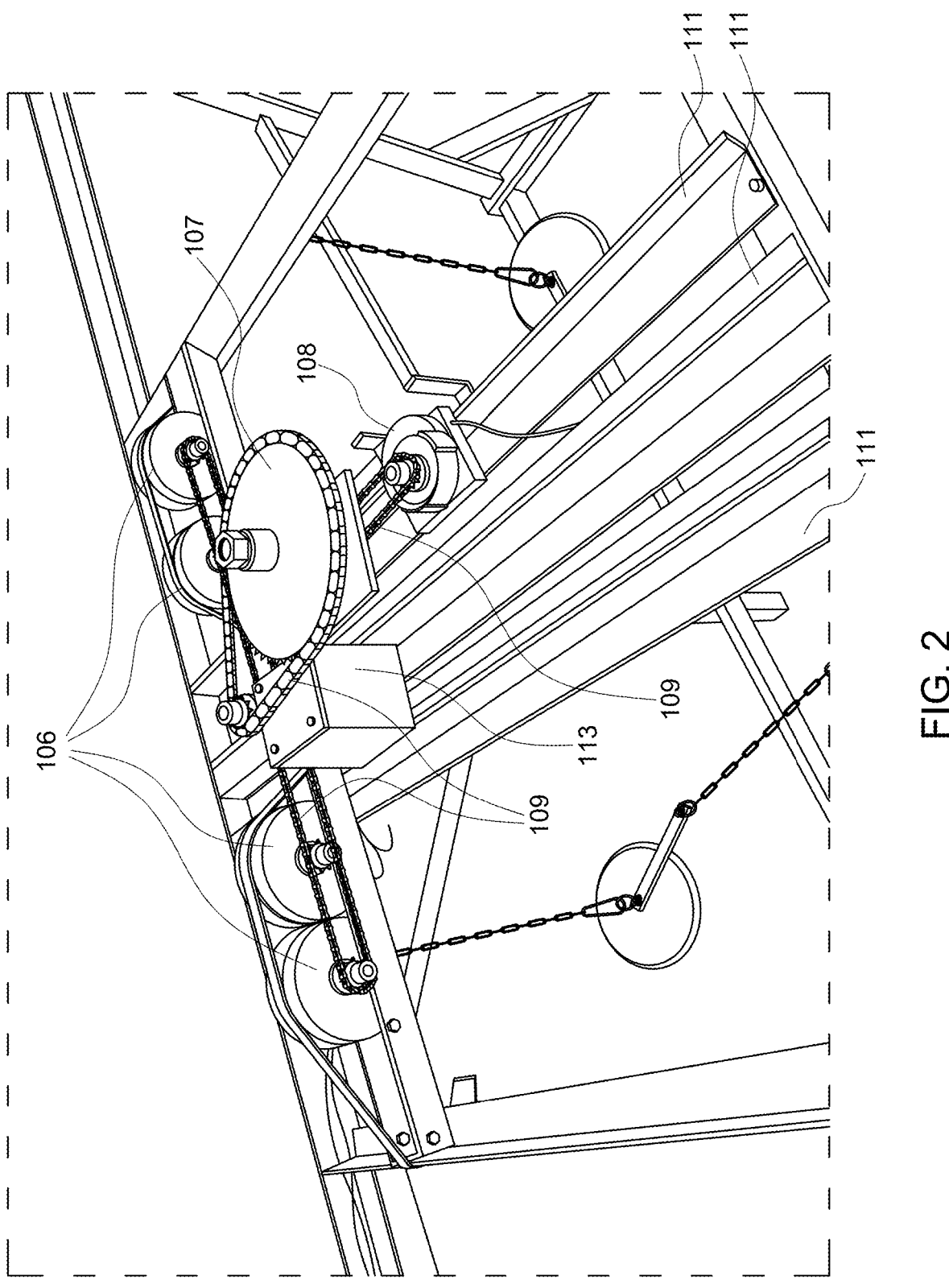
FIG. 2 shows a top view of a continuous electric power generator of the disclosure.

FIG. 2 a top view of the continuous electric power generator showing electric generators 106, generator sprocket 107, compensating motor 108, cross bars 111, storage battery 113 and sprocket chains 109.

Figure 3:
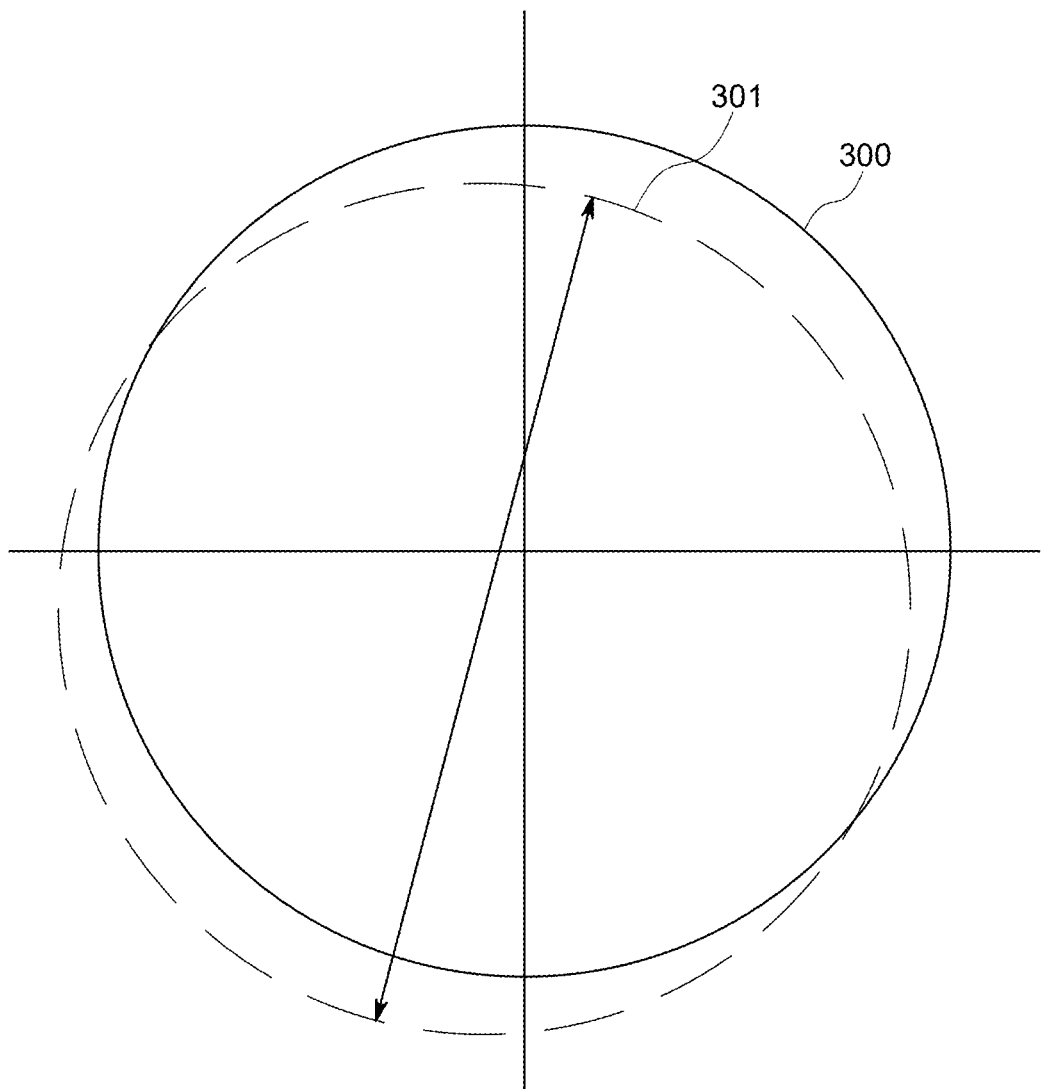
FIG. 3 illustrates an eccentric motion of the weights.

FIG. 3 illustrates the eccentric motion of the weights. The frame is set at a compound angle which creates an eccentric rotation of the weights with respect to the axis of rotation and causes the weights to oscillate creating continuous kinetic energy. Circle 301 illustrates the eccentric motion of the weights. Circle 300 illustrates the ideal motion in a circle for comparison. The solid cross lines illustrate the axis of rotation. The axis of rotation would be at the top center of the three dimensional frame.

In embodiments, electrical power can go from the generator to a controller and then to a 12 Volt storage battery. From the battery, power can go to the compensating motor and the other can go to an inverter for external usage.

EXAMPLE

In one example illustrated in Example 1, the frame is about 8 feet long, 4 feet wide, and 52 inches high. The frame edges are made from 2 by 2 angle iron. The three arms that hold the weights are each 120° apart. The arms are about 25 inches long and one inch wide and ¼ inch thick. The central rotating hub is about 7 inches in diameter and made from aluminum. The central hub is two inches thick and faced top and bottom with ⅛-inch steel plates. The system includes a speed controller, one or more 12 Volt storage batteries, and a 120 Volt inverter. The weights are about 5 inches in diameter and 1½ inches thick. The chains holding the weights can be 24 inches horizontal and 18 inches vertical. The weights may be 2½ LB weights, 5 LB weights, or 10 LB weights. 10 lb weights are illustrated. The chain for the sprockets is #40. The generator sprocket can be two inches in diameter and the connecting sprocket 7 inches in diameter. The exemplary system can run essentially continuously without external energy input.

The system can be easily scaled up or down as needed for a particular application. Thus, the system can be scaled up to a size similar to a wind turbine that generates 2 MW to 3 MW of electrical power.

While this disclosure includes specific examples, it will be apparent after an understanding of the disclosure of this application has been attained that various changes in form and details may be made in these examples without departing from the spirit and scope of the claims and their equivalents.

The invention claimed is:

1. A continuous electric power generator comprising:
a three dimensional rectangular frame comprising twelve edges;
a top crossbar comprising a circular hub disposed at the top center of the three dimensional rectangular frame comprising three extension arms at approximately 120 degree angles with each other, the three extension arms each comprising a connector connected to a weight;
wherein the attached extension arms of the circular hub, and attached weights, are configured to rotate freely in a circular motion;
wherein the frame is configured at a compound angle to cause the weights to rotate in an eccentric circle with respect to an axis of rotation at the top center of the three dimensional frame;
the circular hub is connected to a compensating motor and one or more electric generators; and
the electric generator(s) are connected to one or more storage batteries.

2. The continuous electric power generator of claim 1, wherein the three-dimensional frame ranges from 4 to 12 feet long, two to six feet wide, and two to six feet high.

3. The continuous electric power generator of claim 1, wherein the three-dimensional frame comprises four legs disposed at each corner of the bottom of the three-dimensional rectangular frame, and wherein three legs are the same length, and the fourth leg is longer than the other three.

4. The continuous electric power generator of claim 3, wherein the fourth leg is six to ten inches longer than the other three legs.

5. The continuous electric power generator of claim 1, wherein the connectors connected to the weights are chains.

6. The continuous electric power generator of claim 1, wherein the weights are connected to each other with connectors or chains.

7. The continuous electric power generator of claim 1, wherein the frame comprises iron, steel, or aluminum.

8. The continuous electric power generator of claim 1, wherein the weights are between 2 and 20 pounds.

9. The continuous electric power generator of claim 1, wherein the electric generator is connected to a controller.

10. The continuous electric power generator of claim 1, wherein one or more of the storage batteries is connected to an inverter.

* * * * *